(12) United States Patent
Horng et al.

(10) Patent No.: US 6,724,106 B1
(45) Date of Patent: Apr. 20, 2004

(54) MINIATURE BRUSHLESS DC FAN MOTOR

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

(*) Notice: Subject to any disclaimer, the term of this patent is extended or adjusted under 35 U.S.C. 154(b) by 0 days.

(21) Appl. No.: 10/373,725

(22) Filed: Feb. 27, 2003

(51) Int. Cl.$^7$ .................................................. H02K 7/00
(52) U.S. Cl. .............. 310/40 MM; 310/63; 310/156.01
(58) Field of Search ........................... 310/40 MM, 62, 310/63, 52, 58, 156.11, 156.01, 156.28, 156.49, 156.53, 261, 266; 29/596–598

(56) References Cited

U.S. PATENT DOCUMENTS 5,607,329 A * 3/1997 Cho et al. ...................... 440/6
6,388,346 B1 * 5/2002 Lopatinsky et al. ........... 310/63
6,565,326 B2 * 5/2003 Horng et al. ................ 417/44.1
6,608,411 B2 * 8/2003 Horng et al. ................ 310/68 R

* cited by examiner

*Primary Examiner*—Burton S. Mullins
*Assistant Examiner*—Leda Pham
(74) *Attorney, Agent, or Firm*—Bacon & Thomas, PLLC

(57) ABSTRACT

A miniature brushless dc fan motor comprises an annular housing, a bearing assembly, a permanent magnet set, a blade set and a coil set. The permanent magnet set is inserted into a hub of the blade set which is located at a center. A shaft is extended through the permanent magnet set to form a rotor. The coil set is secured to an inner circumference of the annular housing and radially aligned with the permanent magnet set. An air channel is formed between the permanent magnet set and the coil set, and adapted to accommodate the blade set.

7 Claims, 3 Drawing Sheets

MINIATURE BRUSHLESS DC FAN MOTOR

BACKGROUND OF THE INVENTION

1. Field of the Invention

The present invention is related to a miniature brushless dc fan motor and more particularly to a permanent magnet set incorporated into a center of a fan wheel, and plural coils incorporated into an annular housing, thereby forming an air channel between the permanent magnet set and the coils.

2. Description of the Related Art

Referring to FIG. 1, a conventional miniature fan 1 includes a bearing assembly 11, a stator 12 and a rotor 13. The bearing assembly 11 includes at least one bearing located at a center of the stator 12. The stator 12 is provided with a plurality of coils 121 and a plurality of pole plates 122. After assembling, the bearing assembly 11 and the stator 12 are co-axially fixed at a center of a fan housing 10. The rotor 13 includes a shaft 131, a permanent magnet set 132 and a blade set 133. The shaft 131 of the rotor 13 extends through the bearing assembly 11 to nest the stator 12 in the rotor 13 and thus the miniature fan 1 is assembled. So then the blade set 133 is extended outward from the outer circumference of the rotor 13 and adapted to drive air.

The assembled arrangement of the blade set 133, the permanent magnet set 132, the coils 121 and the bearing assembly 11 is nested in order from a maximum diameter to a minimum diameter. In addition to the blade set 133, a radial air gap must further be provided between the permanent magnet set 132 and the coils 121 to thereby induce mutually and rotate the rotor 13. Consequently, the diameter of the miniature fan cannot further be reduced and thus such structural arrangement is unsuitable for miniature fan manufactures.

Referring to FIG. 2, an another conventional miniature fan 2 includes a bearing assembly 21, a rotor 22 and a stator 23. The bearing assembly 21 includes at least one bearing located at a center of stator 22. The rotor 22 includes a permanent magnet set 221 and a blade set 222 whose outer circumference is surrounded by the permanent magnet set 221. After assembling, the bearing assembly 21 and the rotor 22 are co-axially mounted to a center of a fan housing 20. The stator 23 includes a coil set 231 and a plurality of pole plates 232, which are secured to an inner circumference of the fan housing 20. So then the blade set 222 is extended between the axial assembly 21 and the stator 23 and adapted to drive air.

The assembled arrangement of the coil set 231, the permanent magnet set 221, the blade set 222 and the bearing assembly 21 is nested in order from a maximum diameter to minimum diameter. In addition to the blade set 222, a radial air gap must further be provided between the permanent magnet set 221 secured to the outer circumference of the blade set 222, and the coil set 231, thereby the coil set 231 able to induce with the permanent magnet set 221 and rotate the rotor 22. Consequently, the diameter of the miniature fan cannot further be reduced and thus such structural arrangement is unsuitable for miniature fan manufactures.

The present invention intends to provide a miniature brushless dc fan motor, wherein a permanent magnet set incorporated into a center of a fan wheel and, plural coils incorporated into an annular housing, thereby increasing a sectional area of an air channel formed between the permanent magnet set and the coils in such a way to mitigate and overcome the above problem.

SUMMARY OF THE INVENTION

The primary objective of this invention is to provide a miniature brushless dc fan motor, which includes a permanent magnet set incorporated into a center of a fan wheel and, plural coils incorporated into an annular housing, and an air channel formed between the permanent magnet set and the coils so that a sectional area of the air channel is increased.

The miniature brushless dc fan motor in accordance with the present invention comprises an annular housing, a bearing assembly, a permanent magnet set, a blade set and a coil set. The permanent magnet set is inserted into a hub of the blade set which is located at a center. A shaft is extended through the permanent magnet set to form a rotor. The coil set is secured to an inner circumference of the annular housing and radially aligned with the permanent magnet set. An air channel is formed between the permanent magnet set and the coil set, and adapted to accommodate the blade set.

Other objectives, advantages and novel features of the invention will become more apparent from the following detailed description and the accompanying drawings.

BRIEF DESCRIPTION OF THE DRAWINGS

The present invention will now be described in detail with reference to the accompanying drawings herein.

DETAILED DESCRIPTION OF THE INVENTION

Figure 3:
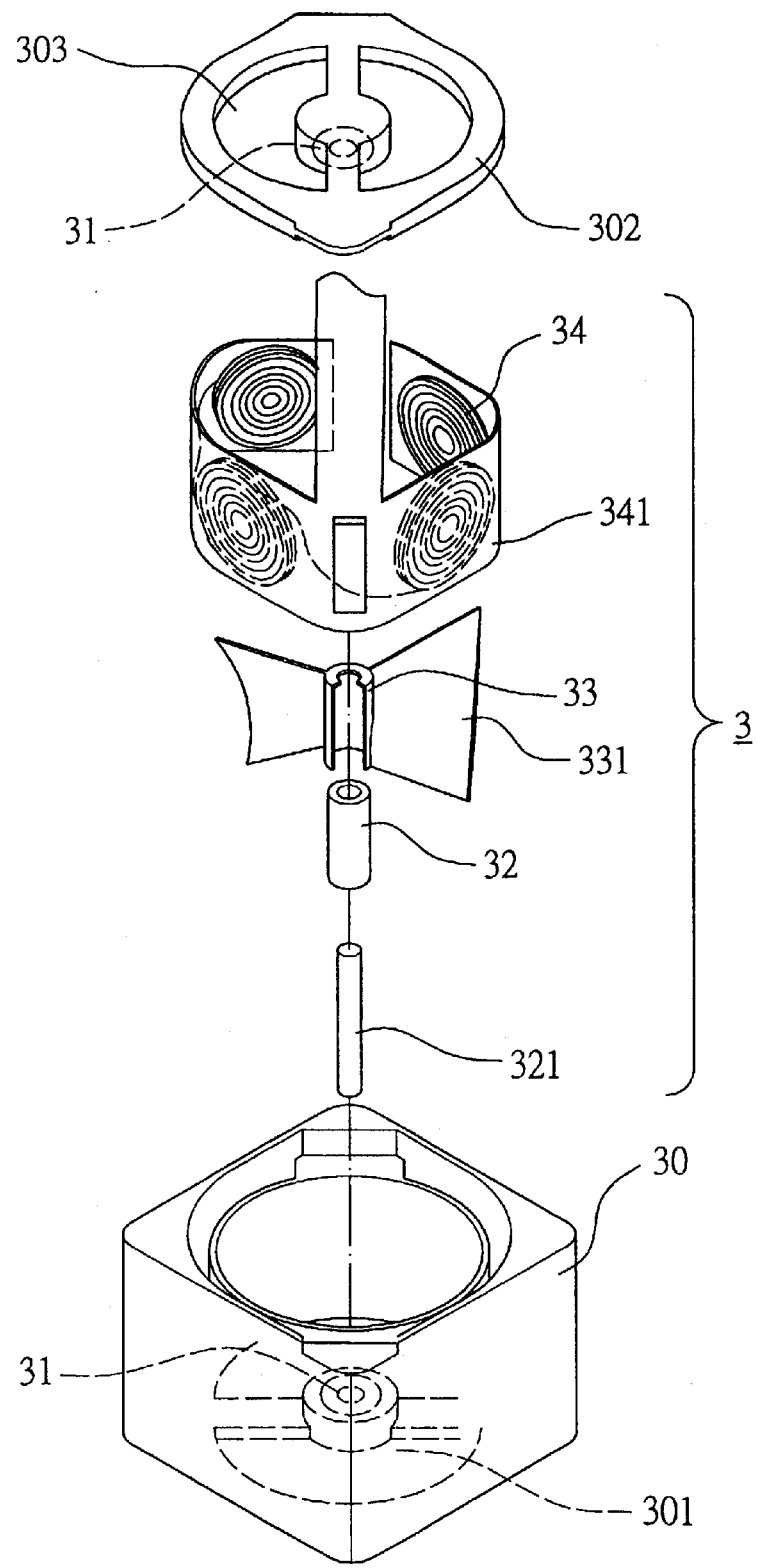
FIG. 3 is an exploded perspective view of a miniature brushless dc fan motor in accordance with an embodiment of the present invention.

Referring to FIG. 3, a miniature fan 3 in accordance with the present invention includes an annular housing 30, a bearing assembly 31, a permanent magnet set 32, a blade set 33 and a coil set 34.

Referring again to FIG. 3, the annular housing 30 includes an air outlet 301, a lid 302 and an air inlet 303. The annular housing 30 is constituted by an annular wall having two ends, and one end is adapted to form with the air outlet 301 while the other end forming with the air inlet 303. To constitute the bearing assembly 31, two bearing units are coupled to the annular housing 30 and the lid 302. The annular housing 30 and the lid 302 are provided with supporting bars to mount the bearing units at the corresponding centers that a centerline is running therebetween and a shaft 321 is supported for rotation.

Referring again to FIG. 3, the permanent magnet set 32 includes a plurality of poles which are inserted into a hub of the blade set 33 and passed through by a shaft 321 so that a rotor is constituted. In assemble operation, two ends of the shaft 321 are pivoted in the bearing assembly 31 for rotation of the rotor. As to the blade set 33, it includes a plurality of blades 331 extending radially.

Referring again to FIG. 3, the coil set 34 includes a plurality of coils which are equi-spaced on a film circuit 341 and connected each other to thereby generate an alternative magnetic field. In assemble operation, the coil set 34 is secured to the annular wall of the annular housing 30 so that a stator is constituted and the coils are aligned with the poles of the permanent magnet set 32. A radial air gap is formed between the permanent magnet set 32 and the coil set 34, and served as an air channel which is axailly aligned with the air inlet 303 and the air outlet 301. The air channel is employed to accommodate the blades 331 of the blade set 33 for rotation, as shown in FIG. 5.

In the inventive design of the miniature fan, the radial air gap is confined within an effective inducing distance as well as the alternative magnetic field generated from the coil set 34 is able to actuate the poles of the permanent magnet set 32. When the blade set 33 is rotated, it provides an adequate amount of air for heat dissipation.

Figure 4:
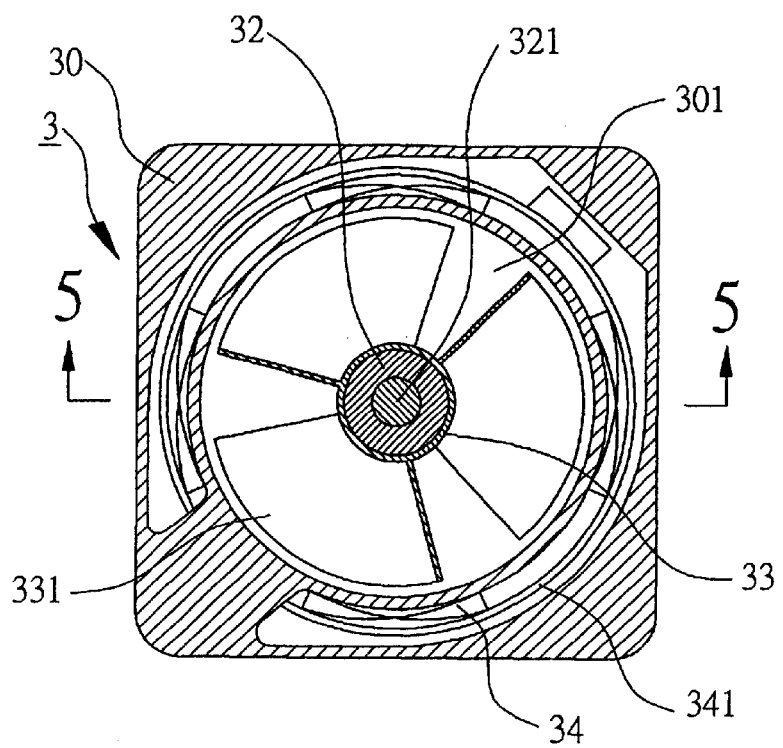
FIG. 4 is a top view of the miniature brushless dc fan motor in accordance with the embodiment of the present invention.
Figure 5:
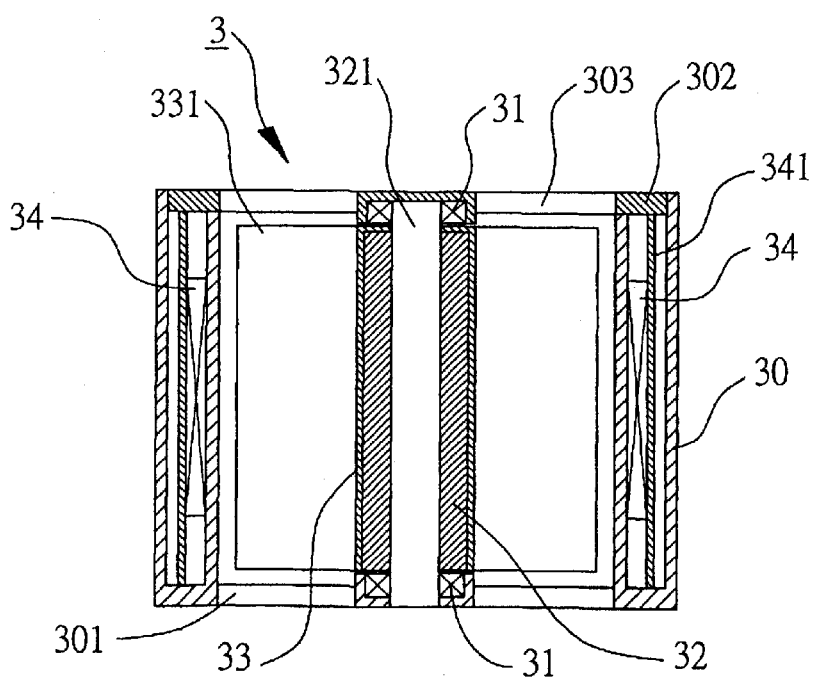
FIG. 5 is a cross-sectional view, taken along line 5—5 in FIG. 4, of the miniature brushless dc fan motor in accordance with the embodiment of the present invention.

Referring to FIGS. 4 and 5, the blade set 33 is located at an inner space of the annular housing 30 while the permanent magnet set 32 and the shaft 321 being incorporated into the hub of the blade set 33. The two ends of the shaft 321 are pivoted in the bearing assembly 31 so that the permanent magnet set 32 and the bearing assembly 31 are stacked in a co-axial assembled relationship instead of a conventional nested relationship. Consequently, the rest inner space of the annular housing 30 reserved for the blade set 33 is increased.

Referring again to FIGS. 4 and 5, the increased air channel is defined in a space formed between the permanent magnet set 32 and the coil set 34 and adapted to accommodate the blade set 33 whose blade 332 are radially extended. Also, the increased air channel is connected between the air inlet 303 and the air outlet 301.

Referring again to FIGS. 3 and 5, when the coil set 34 is energized, the magnetic field of the coil set 34 is induced with the permanent magnet set 32 so that it can rotate the blade set 33 whose hub accoummodate the permanent magnet set 32. Meanwhile, ambient air passes through the air inlet 303 and enters the annular housing 30. Subsequently, the blade 331 of the blade set 33 speeds up the ambient air and ejects it from the air outlet 301.

To enlarge an area of the air channel, referring again to FIG. 5, the assembled arrangement of the permanent magnet set 32, the blade set 33 and the coil set 34 is nested in order from a maximum diameter to a minimum diameter. In addition, a radial air gap is served as an air channel that is axially connected between the air inlet 303 and the air outlet 301. The radial air gap of the present invention is able to accommodate the blade set 33 for rotation and thus the arrangement of the fan members is suitable for a miniature fan.

Figure 1:
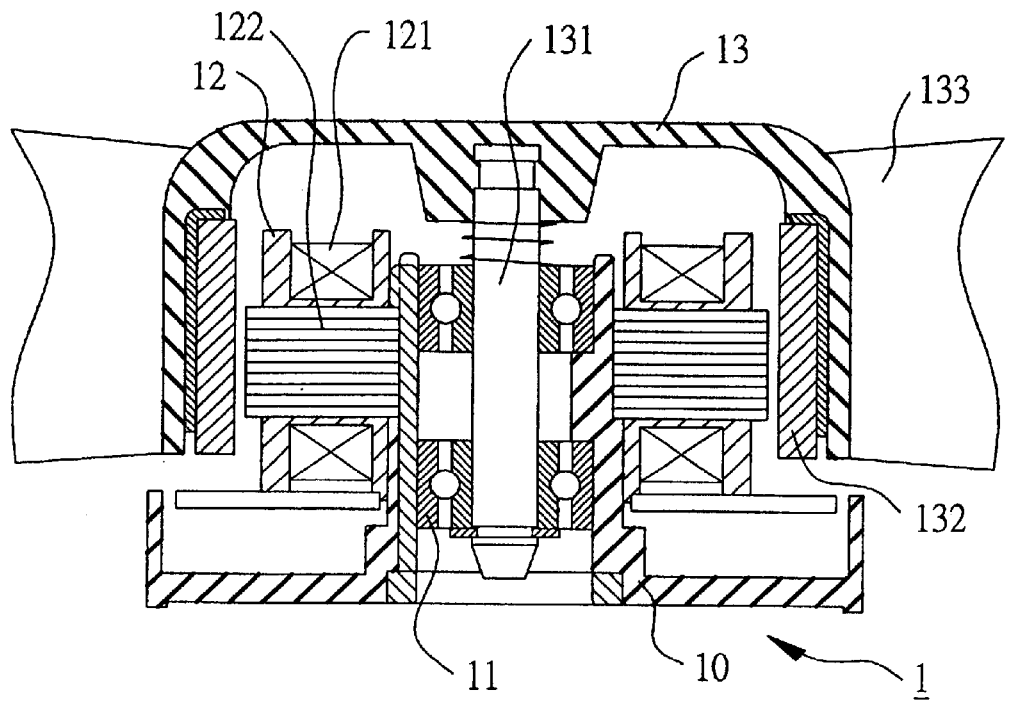
FIG. 1 is a cross-sectional view of a conventional miniature fan in accordance with the prior art.

Referring again to FIGS. 1 and 5, in comparison with the present invention, the conventional assembled arrangement of the blade set 133, the permanent magnet set 132, the coils 121 and the bearing assembly 11 is nested in order from a maximum diameter to a minimum diameter. By contrast, a radial air gap must further be possessed between the permanent magnet set 132 and the coils 121 that the diameter of the conventional miniature fan cannot further be reduced and thus such structural arrangement is unsuitable for miniature fan manufactures.

Figure 2:
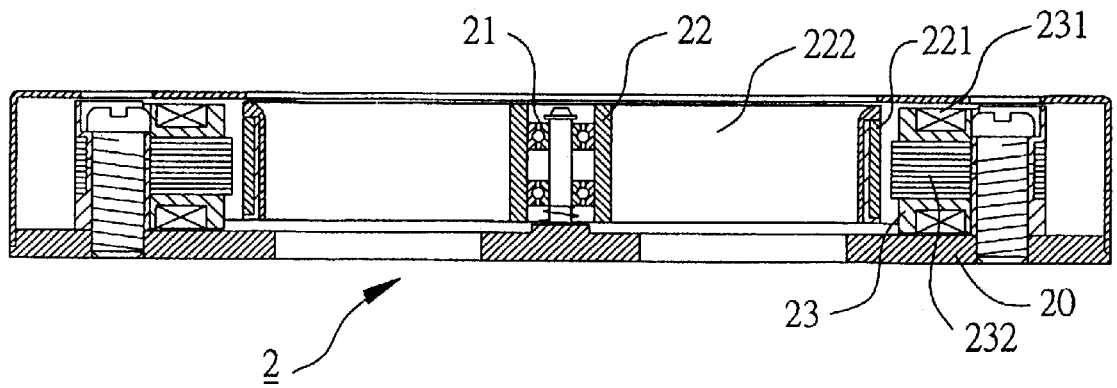
FIG. 2 is a cross-sectional view of an another conventional miniature fan in accordance with the prior art.

Referring again to FIGS. 2 and 5, in comparison with the present invention, the another assembled arrangement of the coil set 231, the permanent magnet set 221, the blade set 222 and the bearing assembly 21 is nested in order from a maximum diameter to minimum diameter. By contrast, a radial air gap must further be possessed between the permanent magnet set 221 and the coil set 231 that the diameter of the another conventional miniature fan cannot further be reduced and thus such structural arrangement is unsuitable for miniature fan manufactures.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A miniature brushless dc fan motor, comprising:
    an annular housing including at least one bearing;
    a blade set including a hub and a plurality of blades;
    a permanent magnet set consisted of poles and being passed through a shaft which is pivoted in the bearing, the permanent magnet set is inserted into the hub of the blade set;
    a coil set being secured to an inner circumference of the annular housing and aligned with the poles of the permanent magnet set; and
    a radial air gap formed between the permanent magnet set and the coil set, and being served as an air channel which is adapted to accommodate the blade set;
    wherein when the coil set is energized, the coil set is induced with the permanent set and thus the blade set is rotated.

2. The miniature brushless dc fan motor as defined in claim 1, further comprising a lid, the lid covers the annular housing and includes a bearing aligned with that of the annular housing to form a bearing assembly, which is adapted to pivot the shaft fixed to the blade set.

3. The miniature brushless dc fan motor as defined in claim 2, wherein each of the annular housing and the lid are provided with at least one supporting bar.

4. The miniature brushless dc fan motor as defined in claim 1, wherein the annular housing includes an annular wall adapted to mount the coil set.

5. The miniature brushless dc fan motor as defined in claim 4, wherein the coil set includes a plurality of coils equi-spaced thereon.

6. The miniature brushless dc fan motor as defined in claim 4, wherein the annular housing has a first end formed with an air inlet and a second end formed with an air outlet.

7. The miniature brushless de fan motor as defined in claim 6, wherein the air channel is axially aligned with the air inlet and the air outlet.

* * * * *